United States Patent
Smith et al.

(10) Patent No.: US 9,440,751 B2
(45) Date of Patent: Sep. 13, 2016

(54) ULTRA LOW NOISE DATA ACQUISITION CIRCUIT

(71) Applicant: HONEYWELL INTERNATIONAL INC., Morristown, NJ (US)

(72) Inventors: Douglas Edward Smith, Phoenix, AZ (US); John C. Garcia, Peoria, AZ (US); Callen Gordon, Freeport, IL (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 322 days.

(21) Appl. No.: 14/285,425

(22) Filed: May 22, 2014

(65) Prior Publication Data

US 2015/0338216 A1 Nov. 26, 2015

(51) Int. Cl.
*B64G 1/24* (2006.01)
*B64G 1/28* (2006.01)
*B64G 1/36* (2006.01)
*G01C 19/30* (2006.01)

(52) U.S. Cl.
CPC . *B64G 1/36* (2013.01); *B64G 1/24* (2013.01); *B64G 1/286* (2013.01); *G01C 19/30* (2013.01)

(58) Field of Classification Search
CPC .......... B64G 1/24; B64G 1/286; B64G 1/36; G01C 19/30
See application file for complete search history.

(56) References Cited

U.S. PATENT DOCUMENTS

| | | | |
|---|---|---|---|
| 5,018,858 A | 5/1991 | Malvern | |
| 5,090,810 A | 2/1992 | Malvern | |
| 5,112,128 A | 5/1992 | SooHoo et al. | |
| 5,386,738 A * | 2/1995 | Havenhill | B64G 1/286 74/5.22 |
| 5,437,420 A | 8/1995 | Rosen | |
| 5,932,802 A | 8/1999 | Ogawa | |
| 8,020,809 B2 * | 9/2011 | Peck | B64G 1/286 244/165 |
| 2003/0188592 A1 * | 10/2003 | Hyde | B64G 1/286 74/5.45 |
| 2013/0125667 A1 | 5/2013 | Fitz-Coy et al. | |

FOREIGN PATENT DOCUMENTS

CN 102424117 A 4/2012
WO 2013184084 A1 12/2013

OTHER PUBLICATIONS

Fang, Jiancheng et al., Decoupling control of magnetically suspended rotor system in control moment gyros based on an inverse system method; IEEE/ASME Transactions on Mechatronics, vol. 17 No. 6, December 2012.
Burt, et al., Failure Analysis of International Space station Control Moment Gyro; The Boeing Company, Houston, TX, NASA Johnson Space Center, Houston Texas, Aug. 2003.
Fang et al., High-Precision Control for a Single-Gimbal Magnetically Suspended Control Moment Gyro Based on Inverse System Method, IEEE Transactions on Industrial Electronics, vol. 58.9, Sep. 2011.
Fan, et al., Nonlinear Attitude Control of Flexible Spacecraft with Scissored Pairs of Control Moment Gyros, 2010 First International Conference on Pervasive Computing, Signal Processing and Applications, Sep. 19, 2010.

* cited by examiner

*Primary Examiner* — Harshad R Patel
*Assistant Examiner* — Punam Roy
(74) *Attorney, Agent, or Firm* — Lorenz & Kopf, LLP

(57) ABSTRACT

An acquisition circuit for a vehicle or other system is provided. The system, for example, may include, but is not limited to a control moment gyroscope, and a fully differential ground isolated acquisition circuit communicatively connected to the control moment gyroscope and configured to acquire a differential data signal on the control moment gyroscope and output the differential data signal to at least one output node. The acquisition circuit may include, but is not limited to a ground reference correction circuit configured to recenter the differential data signal on at least one output node, and at least one ultra-high impedance output circuit coupled between the ground reference correction circuit and the input differential circuit.

20 Claims, 3 Drawing Sheets

ULTRA LOW NOISE DATA ACQUISITION CIRCUIT

STATEMENT REGARDING FEDERALLY SPONSORED RESEARCH OR DEVELOPMENT

This invention was made with Government support under a Classified Prime Contract, Honeywell Subcontract Number R008.2. Outside Funding Entity is Classified. The Government has certain rights in the invention.

TECHNICAL FIELD

The present disclosure generally relates to data acquisition circuits, and more particularly relates to a data acquisition system for a control moment gyroscope.

BACKGROUND

Data acquisition circuits are subject to noise from a variety of sources. Circuits used in space applications are particularly subject to leakage current as the radiation from space tends to deteriorate the circuit. Accordingly, the signal to noise ratio (SNR) in traditional data acquisition circuits tends to be poor for broadband sensors. This is because it is very difficult to achieve high common mode rejection (CMR), which reduces noise levels (thus allowing for a high SNR), and high gain (increases SNR through signal chain) in broadband sensors circuits. A standard instrumentation amplifier can be used in high precision circuits for high gain, and CMR with special caveats on signal type, or pass-band, or lesser accuracy requirements. Accordingly, an acquisition circuit capable of having a higher signal-to-noise ratio without these and other limitations is desirable.

BRIEF SUMMARY

In one embodiment, for example, a vehicle is provided. The vehicle may include, but is not limited to a control moment gyroscope comprising a rotor mounted in a gimbal, and an acquisition circuit communicatively connected to the control moment gyroscope. The acquisition circuit may include, but is not limited to a tachometer comprising at least one single-phase or multi-phase rate sensor configured to output a differential signal corresponding to an angular rate of the gimbal, an input precision divider electrically coupled to each phase of the rate sensor and configured to add gain to the differential signal corresponding to the angular rate of the gimbal, a first buffer electrically coupled to the input precision divider and configured to receive a first component of the differential signal, a second buffer electrically coupled to the input precision divider and configured to receive a second component of the differential signal, a common mode indicator circuit electrically coupled to the first buffer and the second buffer and configured to average the first component of the differential signal and the second component of the differential signal, a ground reference correction circuit electrically coupled to the common mode indicator circuit and configured to generate a ground reference correction signal based upon a comparison between the average of the first component of the differential signal and the second component of the differential signal relative to quiet ground, and an ultra-high impedance output circuit electrically coupled between the ground reference correction circuit and the first and second buffers and configured to apply the ground reference correction signal to an input of the first and second buffers substantially equally.

In another embodiment, a data acquisition circuit is provided. The data acquisition circuit may include, but is not limited to, a sensor configured to output a differential data signal, an input precision divider electrically coupled to the sensor and configured to add gain to the differential data signal, a first buffer electrically coupled to the input precision divider and configured to receive a first component of the differential signal, a second buffer electrically coupled to the input precision divider and configured to receive a second component of the differential signal, a common mode indicator circuit electrically coupled to the first buffer and the second buffer and configured to average the first component of the differential signal and the second component of the differential signal, a ground reference correction circuit electrically coupled to the common mode indicator circuit and configured to generate a ground reference correction signal based upon a comparison between the average of the first component of the differential signal and the second component of the differential signal to ground, and an ultra-high impedance output circuit electrically coupled between the ground reference correction circuit and the first and second buffers and configured to apply the ground reference correction signal to an input of the first and second buffers.

In yet another embodiment, a system is provided. The system may include, but is not limited to, a control moment gyroscope; and a fully differential ground isolated acquisition circuit communicatively connected to the control moment gyroscope and configured to acquire a differential data signal on the control moment gyroscope and output the differential data signal to at least one output node. The acquisition circuit may include, but is not limited to, a ground reference correction circuit configured to recenter the differential data signal at the at least one output node, and at least one ultra-high impedance output circuit coupled between the ground reference correction circuit and the at least one output node.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, an acquisition circuit is provided. The acquisition circuit utilizes a fully differential ground reference correction circuit which is isolated from ground to improve the signal-to-noise ratio (SNR) of the acquisition circuit. The improved SNR is accomplished by allowing the input gain to be increased relative to legacy systems in spite of significant common mode noise down to DC in frequency (many volts). As discussed in further detail below, the gain is increased without introducing detectible noise across full bandwidth (nearly "invisible" circuit to differential signal being carried). An improved signal-to-noise ratio allows for more accurate data acquisition in sensitive circuits.

The circuit discussed herein is configured such that noise from the external system does not directly couple to the system quiet ground, but to a created reference which returns the noise back to the supply rails where it will not be picked up—this is a noise performance increase over prior art which permitted the noise to enter the quiet ground plane causing ground loop pick-up, and lesser performance. This approach greatly increases the CMR of the circuit versus prior art with benefits to SNR over prior art. The circuit is also configured using an ultra-high impedance correction circuit such that there is no significant system noise increase to ultra-high precision caused by the removal of the component leakage currents from the system (removal of noise)—this is not typical either. Prior attempts to remove leakage noise sources increased noise level from other sources preventing the level of gain, and precision attained here. The invention balances the use of ultra-high impedance (which is often termed "dangerous" due to typical increased noise pick-up, and bias clipping) in a way that gains its benefits (virtually no noise coupling) while bypassing its historical disadvantages.

Figure 1:
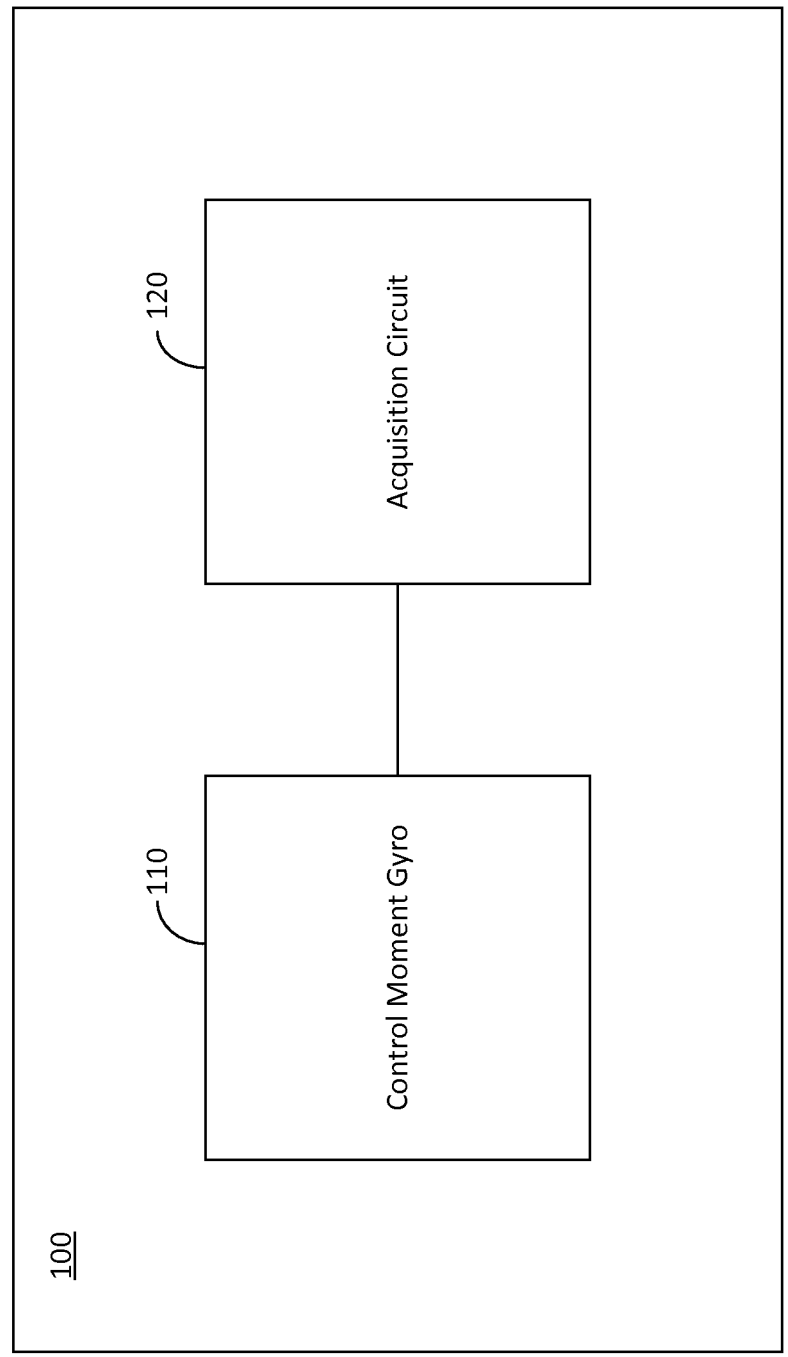
FIG. 1 is a block diagram of a vehicle having a control moment gyroscope in accordance with an embodiment.

FIG. 1 is a block diagram of a vehicle 100 having a control moment gyroscope 110 in accordance with an embodiment. The vehicle 100 may be a spacecraft, a satellite, a space station, a rocket, or any other system which may use a control moment gyroscope 110. However, any broadband, high precision sensor application may use the techniques described herein to greatly improve system SNR. The control moment gyroscope 110 is an attitude control device. The configuration of the control moment gyroscope 110 may vary depending upon the vehicle 100, but generally may include a spinning rotor and one or more motorized gimbals that transfer the rotor's angular momentum to the vehicle. As the rotor tilts, the changing angular momentum produces a gyroscopic torque that rotates the vehicle 100.

In order to accurately control the control moment gyroscope 110, the vehicle 100 further includes an acquisition circuit 120. The acquisition circuit 120 includes one or more sensors which output data used for controlling the control moment gyroscope 110. In one embodiment, for example, the acquisition circuit 120 includes a tachometer used to determine the rotational velocity of the gimbal in the control moment gyroscope 110. Typical systems for measuring the rotational velocity of a gimbal were subject to ground loop noise, leakage current, bias, offsets, and a variety of other undesirable signals which reduced the signal-to-noise ratio of the tachometer. As discussed in further detail below, the acquisition circuit 120 utilizes a fully differential ground reference correction circuit to dramatically increase the signal-to-noise ratio relative to traditional sensor systems. The techniques described herein allow CMG Gimbal Rate control error to be reduced by roughly 25% over legacy approaches. This much error decrease allows for a SNR increase of 4× over legacy approaches. The SNR increase was impossible with other approaches. The invention circuit is configured such that noise from the external system does not directly couple to the system quiet ground, but to a created reference which returns the noise back to the supply rails where it will not be picked up—this allows for a noise performance increase over legacy systems which permitted the noise to enter the quiet ground plane causing ground loop pick-up, and, thus, lesser performance. As discussed in further detail below, the circuit discussed herein also includes an ultra-high impedance correction circuit such that there is no significant system noise increase to the ultra-high precision output caused by the removal of the component leakage currents from the system (removal of noise). Prior attempts to remove leakage noise sources increased noise level from other sources preventing the level of SNR gain and precision attained with this approach. The system discussed herein balances the use of ultra high impedance (which is often termed "dangerous" due to typical increased noise pick-up, and bias clipping) in a way that gains its benefits (virtually no noise coupling) while bypassing its historical disadvantages.

Figure 2:
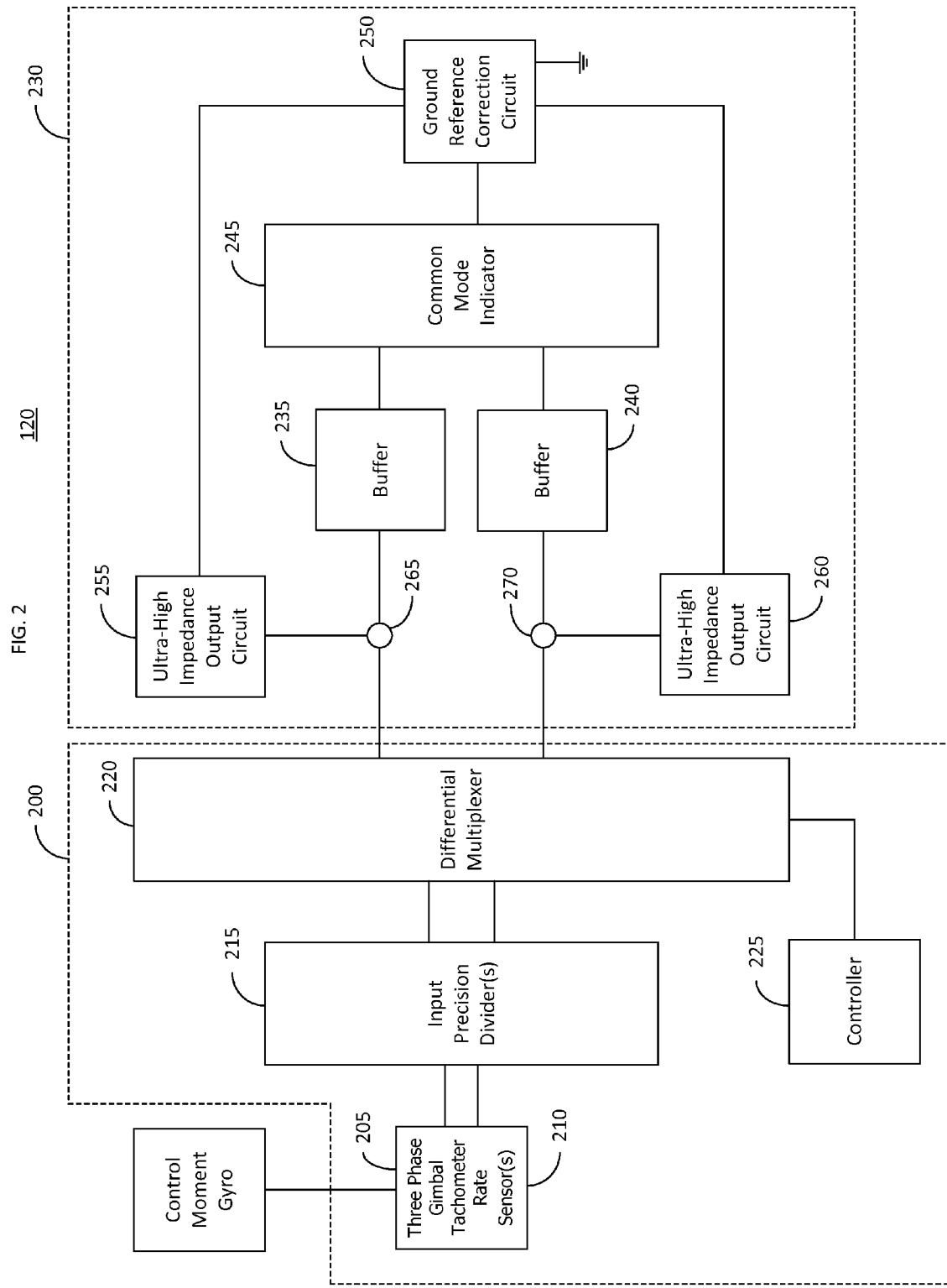
FIG. 2 is a block diagram of an acquisition circuit in accordance with an embodiment.

FIG. 2 is a block diagram of an acquisition circuit 120 in accordance with an embodiment. The acquisition circuit 120 includes a front end 200 and a back end 230. As discussed in further detail below, the front end 200 of the acquisition circuit 120 sets the initial gain for the acquisition circuit 120 and outputs the data acquired by a sensor (e.g., a tachometer) while the back end 230 of the circuit provides feedback, permits maximization of the the available initial gain of the circuit against clipping constraints (higher SNR) and reduces the noise in the acquisition circuit 120 to increase the signal to noise ratio of the acquisition circuit 120 (by preventing noise from the external sensor system, and the internal components of the circuit itself from entering the quiet analog ground plane).

The front end 200 of the acquisition circuit may vary depending upon what type of data is being acquired. In the embodiment illustrated in FIG. 2, the front end 200 of the acquisition circuit 120 includes a tachometer 205. In this embodiment, for example, the tachometer 205 may include multiphase rate sensors 210. Each of the multiphase rate sensors 210 is configured to output a sensed rotational rate of the gimbal of the tachometer of the control moment gyroscope 110 via a differential signal which can be used to determine the angular velocity of the gimbal. The sensor output signals range from near DC (i.e., a signal having no frequency component) up into the kHz range making them susceptible to broadband noise sources. The differential signal includes at least two separate components, in other words, at least two complimentary communication signals each including the data from the rate sensors. As seen in FIG. 2, each component of the differential signal is transmitted over a separate communication line.

Each rate sensor 210 of the tachometer 205 is electrically coupled to an input precision divider 215. In one embodiment, for example, the input precision divider 215 may be a voltage divider. The input precision divider 215 can be configured to set a gain for the acquisition circuit. Voltage, or current coupling via attenuation if sensor gain is too high, or active gain where it is too low, is typically applied at the front and of the signal chain to maximize gain against ADC (Analog to Digital Converter) range (Any/all sensor types). The circuit can't exceed its electronic operating range at any point or it will clip preventing operation over the full desired range of sensor operation. Noise sources that are present often force the signal into the rail (clipping) which limits the maximum gain that the system can be set to. As discussed in further detail below, the circuits discussed herein removes the clipping problem, and increases gain apace. This increase directly improves SNR without coupling in additional noise due to the technique (unique combination in Broadband, high precision sensors).

Each rate sensor(s) 210 for tachometer 205 may exhibit enhanced accuracy at certain angular positions. Accordingly, each of the input precision dividers 215 is coupled to a differential multiplexer 220. The differential multiplexer 220 is controlled by a controller 225 which selects which of the rate sensors is coupled to the back end 230 of the acquisition circuit 120 such that the data from the rate sensor 210 with the most accurate rate as a function of angular position is fed into the back end 230 acquisition circuit 120. In one embodiment, for example, the multiphase rate sensor 210 may have characteristics internally that make it more accurate in rate on one phase than on the other two. In some instances, the selection of which phase is most accurate is furnished by the tachometer vendor, and is dependent on tachometer shaft angle. A digital processing assembly inside the control moment gyroscope 110 or the controller 225 may detects the gimbal angle from a separate resolver (not illustrated), and selects which phase is most accurate via the differential multiplexer based upon that gimbal angle. In one embodiment, for example, the controller 225 may be a processor such as a central processing unit, a microprocessor, an application specific integrated circuit, a field programmable logic array, or any other logic circuit or combination thereof.

Figure 3:
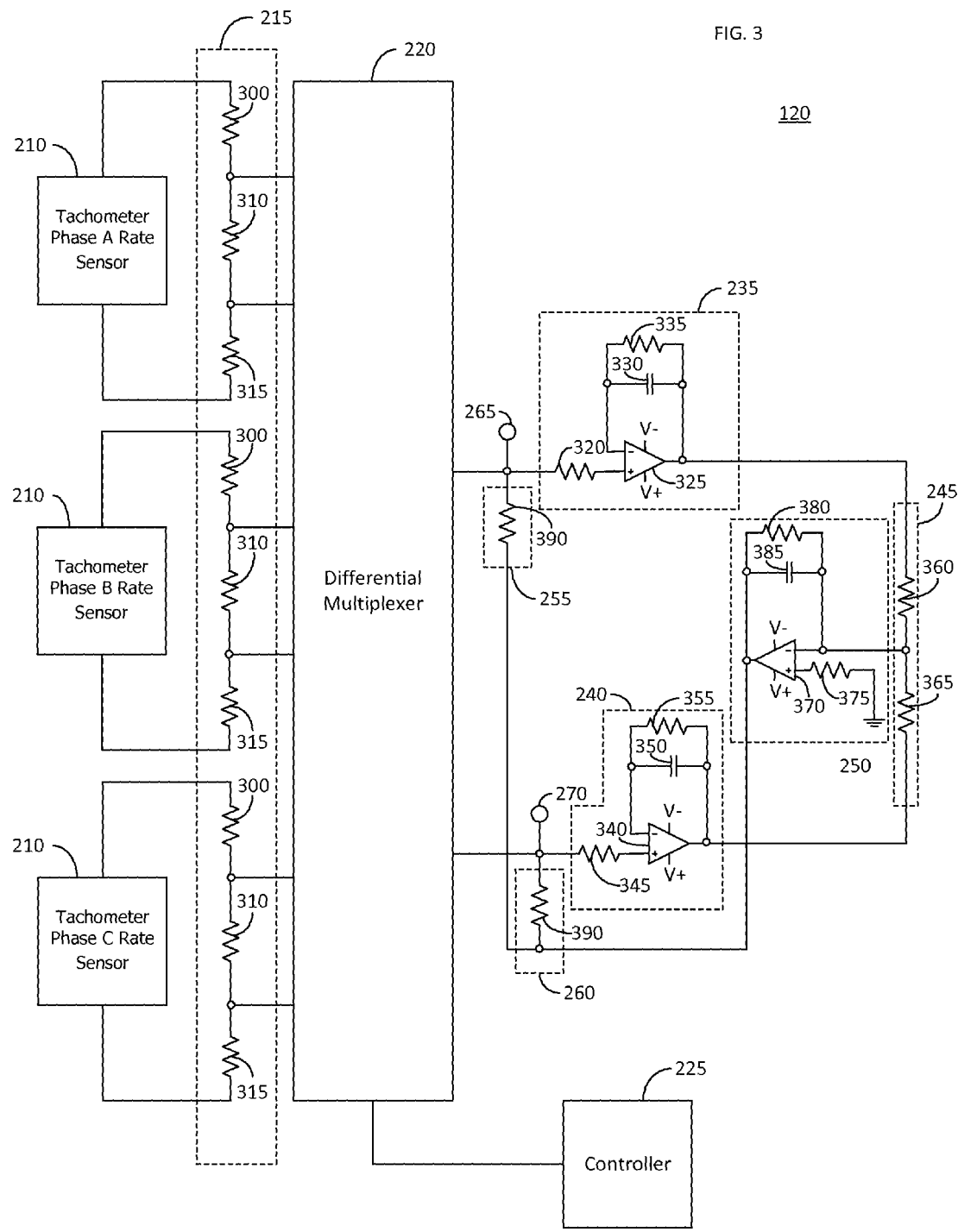
FIG. 3 is a circuit level diagram of an acquisition circuit in accordance with an embodiment.

The output of the acquisition circuit 120, indicated by the output nodes 265 and 270 illustrated in FIGS. 2 and 3, is the output from the differential multiplexer 220, which, as discussed in further detail below, may be modified by the back end 230 of the acquisition circuit 120. The output nodes 265 and 270 may be sampled by a controller, such as the controller 225, or any other another controller in the vehicle 100 and can be used to control the control moment gyroscope 110.

In certain applications, such as space applications, circuits tend to develop unwanted current as circuits age due to radiation. Accordingly, because the output of the rate sensors 210 is a differential signal, which is not coupled to ground, leakage current could take the output of the rate sensors beyond a common mode limit. For example, a circuit component may be configured to receive a signal of up to 12 volts, and, thus, the common mode limit for the circuit may be 12 volts. Accordingly, any part of the data signal received by the circuit component which is above the common mode limit due to leakage current, offset bias or another noise source is cut off, deteriorating the quality of the data signal.

The back end 230 of the acquisition circuit solves the common mode limit while still maintaining isolation from ground. The back end 230 of the acquisition circuit 120 includes two buffers 235 and 240. In one embodiment, for example, each buffer may include an operational amplifier which has a common mode limit, as discussed in further detail below. However, any high impedance input stage (>10 meg) could be used to perform the buffer operation. In the embodiment illustrated in FIG. 2, an input for each buffer 235 and 240 is connected to one of the differential output lines of the differential multiplexer 220. Each buffer 235 and 240 receives an output from one of the input precision dividers 210 through the multiplexer 220 at one of the respective output nodes 265 and 270. The buffered input is output to a common mode indicator 245. In one embodiment, for example, the common mode indicator 245 may comprise a voltage divider, as discussed in further detail below. The common mode indicator 245 averages the output voltage from each buffer 235 and 240 and provides the average voltage to a ground reference correction circuit 250. As discussed in further detail below, the ground reference correction circuit 250 compares the average voltage from the buffers 235 and 240 to system quiet ground. The average voltage is forced to be the same value as the quiet ground by the ground reference correction circuit 250 while all of the noise present on the buffered signals is returned to the system power rails, and never hits quiet ground. Generally, ground loop pickup is caused by noise currents through the system ground. This circuit effectively doesn't have them. Moreover the correcting action of the ground reference correction circuit 250 adds no significant noise to the system at all. It accomplishes this feat by using extremely high impedance to correct the errors in a balanced way. Because the ground reference correction circuit is merely comparing the average voltage to ground, no ground effects (e.g., leakage current, etc.) can pass through to the output nodes of the acquisition circuit. Furthermore, the ground plane should be relatively quiet (i.e., little to no offset voltage, little to no noise, little to no leakage current) as the acquisition circuit 120 is not otherwise coupled to ground. Therefore the ground plane is relatively quiet, and, thus, be capable of providing an accurate and quiet signal for the ground reference correction circuit 250 to use for comparison.

The ground reference correction circuit 250 outputs the difference between average voltage from the buffers 235 and 240 to ground to the output nodes 265 and 270 through ultra-high impedance output circuits 255 and 260. In one embodiment, for example, each ultra-high impedance output circuit 255 and 260 includes one or more resistors having a total resistance around 10 megaohms The range of the resistor values, however, may vary, but may be from around 5 megaohms to around 25 megaohms. Many experts believe that using extremely high impedance in a high precision circuit such as this is dangerous because leakage currents on the board itself encounter such impedances from the board surface itself. In other words strange currents could couple noise into the circuit. The ground reference correction circuit 250 uses this fact to its benefit in two ways, however. The extremely low frequency action of the ground reference correction circuit 250 is virtually invisible noise-wise to the circuit because the circuit can't see its noise any different than it does any other part of the board, apriori. The second way that the ground reference correction circuit 250 uses the fact above is that the servo measures all of these imagined strange effects as part of its job, and precisely corrects them out. It removes the dangerous factors as a part of its job, in other words. Another reason that the experts see danger is because high impedance generates high resistive, or Johnson noise which enters the circuit. The impedance of the invention is so high, however that it rivals the board surface itself so against the capacitance used (pole creation) no significant noise appears. The ultra-high impedance circuits 255 and 260 effectively isolate the output nodes from any possible ground bias and leakage current while still allowing the output of the ground reference correction circuit 250 to correct for any bias and offset coming from the output of the Rate sensors 210, or more importantly the very circuit that is processing the signals, or any nearby, nominally disconnected circuits. In other words, the output of the ground reference correction circuit provides feedback to the output nodes 265 and 270 to re-center the differential signal output from the Rate sensors 210 to prevent the output from the Rate sensors from exceeding the common mode limit of any other circuitry in the acquisition circuit 120.

FIG. 3 is a circuit level diagram of an acquisition circuit 120 in accordance with an embodiment. Each phase of the multiphase rate sensor 210 outputs a differential voltage corresponding to a sensed rate of a system gimbal from the tachometer 205. The differential output of the rate sensor 210 is input into the input precision divider 215. In this embodiment, for example, each input precision divider 215 includes three resistors 300-315 connected in series. In one embodiment, for example, each resistor 300 and 315 may be a 10.0 kilo ohm resistors and each resistor 310 may be a 10.7 kilo ohm resistor. In other embodiments, for example, the gain is typically set such that the maximum output of the sensor corresponds to the maximum range of the data converter (to maximize SNR through the circuit) less the effects of the noise added to the signal. The invention removes the significant noise permitting the signal received at the 0-5V ADC (in this case) to contain the maximum amount of signal, and the minimum amount of noise without clipping in presence of that noise (clipping destroys range). However, one of ordinary skill in the art would recognize that the resistor values can vary. As seen in FIG. 3, the input precision divider 215 is coupled to the differential multiplexer 220 at a node between resistors 300 and 310 and again at a node between resistors 310 and 315.

The differential multiplexer 220 has two outputs. A first output of the differential multiplexer 220 is connected to a resistor 320 of the buffer 235. In one embodiment, for example, the resistor 320 may be a 4.99 kilo ohm resistor. The resistance of resistor 320 typically matches the resistance of resistor 335 resistance to balance and remove amplifier bias currents from the output calculation of the amplifier. In one embodiment, for example, the resistance of resistors 320 and 335 may varies between 1 k, and 5 k depending on the feedback network capacitance chosen to assure unity gain stability of the buffer. However, one of ordinary skill in the art would recognize that the resistor value can vary. The resistor 320 is coupled to a positive input of an operational amplifier 325. A capacitor 330 and resistor 335 are coupled in parallel between the negative input of the operational amplifier 325 and the output of the operational amplifier 325. In one embodiment, for example, the capacitor 330 may be a 100 picofarad capacitor and the resistor 335 may be a 4.99 kilo ohm resistor. The capacitor 330 may vary in value from 10 pf to a couple of hundred pF based upon the unity gain stability factors typically considered in a buffer. However, one of ordinary skill in the art would recognize that the resistor and capacitor values can vary. The operational amplifier 325 is also connected to a positive voltage supply indicated by V+ and a negative voltage supply indicated by V− in FIG. 3. In one embodiment, for example, the positive voltage supply V+ may be a 12 volt voltage supply and the negative voltage supply V− may be a negative 12 volt voltage supply. The supplies may vary across the minimum and maximum allowable voltages of the amplifiers chosen such that the sensor's operating range does not exceed the operating range thus created, and the output does not exceed the range of the data converter, or limit its precision (full range on the sensor signal needs to correspond to full range on the converter for maximum accuracy).

A second output of the differential multiplexer 220 is connected to a resistor 340 of the buffer 240. In one embodiment, for example, the resistor 340 may be a 4.99 kilo ohm resistor. The resistor 340 nominal value should match the resistor 320 nominal value with range discussed above to assure maximum dynamic range of the servo correction capability. However, one of ordinary skill in the art would recognize that the resistor value can vary. The resistor 340 is coupled to a positive input of an operational amplifier 345. A capacitor 350 and resistor 355 are coupled in parallel between the negative input of the operational amplifier 345 and the output of the operational amplifier 345. In one embodiment, for example, the capacitor 350 may be a 100 picofarad capacitor and the resistor 355 may be a 4.99 kilo ohm resistor. However, one of ordinary skill in the art would recognize that the resistor and capacitor values can vary. The resistor and capacitor values should satisfy the criteria of their complimentary components. They should match the values of their complementary opposites for maximum servo dynamic range. The operational amplifier 345 is also connected to a positive voltage supply indicated by V+ and a negative voltage supply indicated by V− in FIG. 3. In one embodiment, for example, the positive voltage supply V+ may be a 12 volt voltage supply and the negative voltage supply V− may be a negative 12 volt voltage supply. The supplies may vary across the minimum and maximum allowable voltages of the amplifiers chosen such that the sensor's operating range does not exceed the operating range thus created, and the output does not exceed the range of the data converter, or limit its precision (full range on the sensor signal needs to correspond to full range on the converter for maximum accuracy).

The output of the operational amplifiers 325 and 345 are coupled to the common mode indicator 245. In the embodiment illustrated in FIG. 3, the common mode indicator 245 includes two resistors 360 and 365 coupled in series. An output from the operational amplifier 325 is coupled to a first end of the resistor 360. In one embodiment, for example, the resistor 360 is a 100 kilo ohm resistor. The resistor 360 may ranges from 100 k to 1 mega ohm depending on the common mode stability performance of the overall ground reference correction circuit 250 loop proven by Middlebrook standard method. However, one of ordinary skill in the art would recognize that the resistor values can vary. An output from the operational amplifier 345 is coupled to a first end the resistor 365. In one embodiment, for example, the resistor 365 is a 100 kilo ohm resistor. The value of the resistor 365 may vary but should substantially match the resistance of resistor 360 to assure a maximum dynamic range for the ground reference correction circuit 250. The second end of the resistors 360 and 365 are connected to the ground reference correction circuit 250.

In the embodiment illustrated in FIG. 3, the ground reference correction circuit 250 includes an operational amplifier 370, resistors 375 and 380 and a capacitor 385. The input from the second end of the resistors 360 and 365 is connected to a negative input of the operational amplifier 370. Resistor 380 and capacitor 385 are connected in parallel between the negative input to the operational amplifier 370 and the output of the operational amplifier 370. The positive input of the operational amplifier 370 is connected to ground through the resistor 375. In one embodiment, for example, the resistor 375 may be a 49.9 kilo ohm resistor, the resistor 380 may be a 1 megaohm resistor and the capacitor 385 may be a 0.47 microfarad capacitor. In other embodiments, for example, the capacitor 385 may range from 0.1 uf or greater in value in order to drive the ground reference correction circuit 250 as low in bandwidth as practicable in order to remove the leakage noise mentioned while preserving the lowest practical noise bandwidth—less bandwidth, less noise above that bandwidth. The choice must be played against the choice of the feedback resistor in this maximization considering the noise, and dynamic range of the buffer/difference stage in the process.

The output of the operational amplifier 370 is connected to the ultra-high impedance output circuits 255 and 260. As discussed above, each ultra-high impedance output circuit 255 and 260 includes one or more resistors 390 having a total resistance around 10 megaohms The range of the resistor values, however, may vary, but may be from around 5 megaohms to around 25 megaohms.

Accordingly, the acquisition circuit 120 provides significant signal-to-noise ratio improvements over conventional systems by utilizing differential data signals and utilizing the ground reference correction circuit 250 and the ultra-high impedance output circuit 255 and 260 to virtually eliminate any influence of leakage current, bias voltage and offset voltage from the output data, while severely limiting external noise entry to the circuit.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle, comprising:
    a control moment gyroscope comprising a rotor mounted in a gimbal; and
    an acquisition circuit communicatively connected to the control moment gyroscope, the acquisition circuit comprising:
        a tachometer comprising at least one single-phase or multi-phase rate sensor configured to output a differential signal corresponding to an angular rate of the gimbal;
        an input precision divider electrically coupled to each phase of the rate sensor and configured to add gain to the differential signal corresponding to the angular rate of the gimbal;
        a first buffer electrically coupled to the input precision divider and configured to receive a first component of the differential signal;
        a second buffer electrically coupled to the input precision divider and configured to receive a second component of the differential signal;
        a common mode indicator circuit electrically coupled to the first buffer and the second buffer and configured to average the first component of the differential signal and the second component of the differential signal;
        a ground reference correction circuit electrically coupled to the common mode indicator circuit and configured to generate a ground reference correction signal based upon a comparison between the average of the first component of the differential signal and the second component of the differential signal relative to quiet ground; and
        an ultra-high impedance output circuit electrically coupled between the ground reference correction circuit and the first and second buffers and configured to apply the ground reference correction signal to an input of the first and second buffers substantially equally.

2. The vehicle of claim 1, wherein the tachometer includes a multi-phase rate sensor having one or more phases, the acquisition circuit includes a plurality of input precision dividers each electrically coupled to one of the one or more phases of the multi-phase rate sensors, and the acquisition circuit further comprises:
    a differential multiplexer having a first output electrically coupled to first buffer, a second output electrically coupled to the second buffer and a plurality of inputs electrically coupled to the plurality of input precision dividers; and
    a controller electrically coupled to the differential multiplexer, the controller configured to select one of the input precision dividers to couple to the first and second buffers.

3. The vehicle of claim 2, wherein the first buffer further comprises:
    a first resistor having a first end and a second end, wherein a first end of the first resistor is electrically coupled to the first output of the differential multiplexer;
    an operational amplifier having a first input electrically connected to the first resistor, a second input and an output;
    a second resistor electrically coupled between the second input of the operational amplifier and the output of the operational amplifier; and
    a first capacitor electrically coupled between the second input of the operational amplifier and the output of the operational amplifier.

4. The vehicle of claim 2, wherein the second buffer further comprises:
    a first resistor having a first end and a second end, wherein a first end of the first resistor is electrically coupled to the second output of the differential multiplexer;
    an operational amplifier having a first input electrically connected to the first resistor, a second input and an output;
    a second resistor electrically coupled between the second input of the operational amplifier and the output of the operational amplifier; and
    a first capacitor electrically coupled between the second input of the operational amplifier and the output of the operational amplifier.

5. The vehicle of claim 1, wherein the input precision divider further comprises three resistors coupled in series.

6. The vehicle of claim 1, where the ground reference correction circuit further comprises:
    a first resistor having a first end and a second end, wherein a first end of the first resistor is electrically coupled to a ground;
    an operational amplifier having a first input electrically connected to the second end of the first resistor, a second input and an output;
    a second resistor electrically coupled between the second input of the operational amplifier and the output of the operational amplifier; and
    a first capacitor electrically coupled between the second input of the operational amplifier and the output of the operational amplifier.

7. The vehicle of claim 1, where the ultra-high impedance output circuit further comprises:
    one or more resistors having a total value greater than about ten megaohms electrically coupled between an output of the ground reference correction circuit and the input of the first buffer; and
one or more resistors having a total value greater than about ten megaohms electrically coupled between an output of the ground reference correction circuit and the input of the second buffer.

8. A data acquisition circuit, comprising:
a sensor configured to output a differential data signal;
an input precision divider electrically coupled to the sensor and configured to add gain to the differential data signal;
a first buffer electrically coupled to the input precision divider and configured to receive a first component of the differential signal;
a second buffer electrically coupled to the input precision divider and configured to receive a second component of the differential signal;
a common mode indicator circuit electrically coupled to the first buffer and the second buffer and configured to average the first component of the differential signal and the second component of the differential signal;
a ground reference correction circuit electrically coupled to the common mode indicator circuit and configured to generate a ground reference correction signal based upon a comparison between the average of the first component of the differential signal and the second component of the differential signal to ground; and
an ultra-high impedance output circuit electrically coupled between the ground reference correction circuit and the first and second buffers and configured to apply the ground reference correction signal to an input of the first and second buffers.

9. The data acquisition circuit of claim 8, wherein the acquisition circuit comprises one or more sensors, a plurality of input precision dividers each electrically coupled to one of the one or more sensors, and the acquisition circuit further comprises:
a differential multiplexer having a first output electrically coupled to first buffer, a second output electrically coupled to the second buffer and a plurality of inputs electrically coupled to the plurality of input precision dividers; and
a controller electrically coupled to the differential multiplexer, the controller configured to select one of the input precision dividers to couple to the first and second buffers.

10. The data acquisition circuit of claim 9, wherein the first buffer further comprises:
a first resistor having a first end and a second end, wherein a first end of the first resistor is electrically coupled to the first output of the differential multiplexer;
an operational amplifier having a first input electrically connected to the first resistor, a second input and an output;
a second resistor electrically coupled between the second input of the operational amplifier and the output of the operational amplifier; and
a first capacitor electrically coupled between the second input of the operational amplifier and the output of the operational amplifier.

11. The data acquisition circuit of claim 9, wherein the second buffer further comprises:
a first resistor having a first end and a second end, wherein a first end of the first resistor is electrically coupled to the second output of the differential multiplexer;
an operational amplifier having a first input electrically connected to the first resistor, a second input and an output;
a second resistor electrically coupled between the second input of the operational amplifier and the output of the operational amplifier; and
a first capacitor electrically coupled between the second input of the operational amplifier and the output of the operational amplifier.

12. The data acquisition circuit of claim 8, wherein the input precision divider further comprises three resistors coupled in series.

13. The data acquisition circuit of claim 8, where the ground reference correction circuit further comprises:
a first resistor having a first end and a second end, wherein a first end of the first resistor is electrically coupled to a ground;
an operational amplifier having a first input electrically connected to the second end of the first resistor, a second input and an output;
a second resistor electrically coupled between the second input of the operational amplifier and the output of the operational amplifier; and
a first capacitor electrically coupled between the second input of the operational amplifier and the output of the operational amplifier.

14. The data acquisition circuit of claim 8, where the ultra-high impedance output circuit further comprises:
one or more resistors having a total value greater than about ten megaohms electrically coupled between an output of the ground reference correction circuit and the input of the first buffer; and
one or more resistors having a total value greater than about ten megaohms electrically coupled between an output of the ground reference correction circuit and the input of the second buffer.

15. A system, comprising:
a control moment gyroscope; and
a fully differential ground isolated acquisition circuit communicatively connected to the control moment gyroscope and configured to acquire a differential data signal on the control moment gyroscope and output the differential data signal to at least one output node, the acquisition circuit comprising:
a ground reference correction circuit configured to recenter the differential data signal at the at least one output node; and
at least one ultra-high impedance output circuit coupled between the ground reference correction circuit and the at least one output node.

16. The system of claim 15, where the ultra-high impedance output circuit further comprises one or more resistors having a total value greater than about ten megaohms.

17. The system of claim 15, where the ground reference correction circuit further comprises:
a first resistor comprising a first end and a second end, wherein a first end of the first resistor is electrically coupled to a ground;
an operational amplifier comprising a first input electrically connected to the second end of the first resistor and further comprising a second input and an output;
a second resistor electrically coupled between the second input of the operational amplifier and the output of the operational amplifier; and
a first capacitor electrically coupled between the second input of the operational amplifier and the output of the operational amplifier.

18. The system of claim 15, where the ground reference correction circuit is configured to generate a ground reference correction signal based upon a comparison of an average voltage of the differential data signal to ground and to transmit the ground reference correction signal through the ultra-high impedance output circuit to the at least one output node.

19. The system of claim 15, wherein the fully differential ground isolated acquisition circuit further comprises:
- a sensor configured to output the differential data signal;
- an input precision divider electrically coupled to the sensor and configured to add gain to the differential data signal;
- a first buffer electrically coupled to the input precision divider and configured to receive a first component of the differential signal;
- a second buffer electrically coupled to the input precision divider and configured to receive a second component of the differential signal;
- a common mode indicator circuit electrically coupled to the first buffer and the second buffer and configured to average the first component of the differential signal and the second component of the differential signal and to transmit the average to the ground reference correction circuit.

20. The system of claim 15, wherein the fully differential ground isolated acquisition circuit comprises one or more sensors, a plurality of input precision dividers each electrically coupled to one of the one or more sensors, and the fully differential ground isolated acquisition circuit further comprises:
- a differential multiplexer having a first output electrically coupled to first buffer, a second output electrically coupled to the second buffer and a plurality of inputs electrically coupled to the plurality of input precision dividers; and
- a controller electrically coupled to the differential multiplexer, the controller configured to select one of the input precision dividers to couple to the first and second buffers.

* * * * *